United States Patent
Way et al.

(10) Patent No.: US 6,366,728 B1
(45) Date of Patent: Apr. 2, 2002

(54) COMPOSITE OPTICAL FIBER TRANSMISSION LINE METHOD

(75) Inventors: David G. Way, Garland; Tiejun Xia, Richardson; Yisong Li, Plano, all of TX (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/493,634

(22) Filed: Jan. 28, 2000

(51) Int. Cl.[7] .............................. G02B 6/02; G02B 6/16
(52) U.S. Cl. ...................... 385/123; 385/126; 385/24; 359/161
(58) Field of Search .................. 385/123, 124, 385/126, 122, 24, 15, 27; 359/161, 124, 173, 179, 341

(56) References Cited

U.S. PATENT DOCUMENTS 5,781,673 A * 7/1998 Reed et al. .................. 385/24
5,854,871 A * 12/1998 Akasaka ..................... 385/123

* cited by examiner

Primary Examiner—Phan T. H. Palmer (57) ABSTRACT

An exemplary composite optical fiber transmission line and method are provided that result in significant advantages. The composite optical fiber transmission line includes a standard single-mode fiber, such as an SMF-28 fiber, a dispersion shifted fiber, such as an NZDSF fiber, and a dispersion compensating fiber. The single-mode fiber receives an input optical signal at a first end and generates a single-mode optical signal at a second end. The dispersion shifted fiber receives the single-mode optical signal at a first end and generates an output optical signal at a second end. The dispersion compensating fiber receives the output optical signal and generates a chromatic dispersion compensated optical signal that, preferably, is at some desired chromatic dispersion level. In one example, the residual chromatic dispersion of the composite optical fiber transmission line is zero or near zero, and the residual chromatic dispersion slope of the composite optical fiber transmission line is zero or near zero.

43 Claims, 7 Drawing Sheets

COMPOSITE OPTICAL FIBER TRANSMISSION LINE METHOD

TECHNICAL FIELD OF THE INVENTION

This invention relates in general to the field of telecommunications and fiber optics and more particularly to a composite optical fiber transmission line and method.

BACKGROUND OF THE INVENTION

Advances in fiber optic technology and fiber optic transmission systems are revolutionizing telecommunications. The main driving force behind this revolution is the promise of extremely high communications bandwidth. A single beam of modulated laser light can carry vast amounts of information that is equal to literally hundreds of thousands of phone calls or hundreds of video channels. Over the past few years, this technology has advanced at such a pace that the bandwidth capabilities have more than doubled every two years. The bandwidth strides have come about through major milestones, breakthroughs, and improvements in various areas such as fiber optic materials and transmitter devices. As a result, bandwidth capability or data rates, which may be expressed in terms of digital bits per second ("bps"), have escalated. In some cases, for example, capacity has increased from 500 Mbps to 10 Gbps and higher.

In a fiber optic transmission system, a digital signal is represented by an optical signal. The optical signal is generated by modulating a laser light or rapidly turning a laser light on and off to represent the various "1" and "0" or "on" and "off" values or states of a digital signal. This may be referred to as amplitude modulation. The laser light, or optical signal, is generally emitted from a laser of an optical transmitter. In the frequency domain, this signal includes numerous frequency components spaced very closely about the nominal center frequency of the optical carrier, such as, for example, 193,000 Ghz.

To increase the overall data rate or bandwidth of a fiber optic transmission system, multiple optical signals may be multiplexed using Wavelength Division Multiplexing ("WDM") or Dense Wideband Division Multiplexing ("DWDM"). WDM and DWDM both involve simultaneously transmitting two or more optical signals, each at a different wavelength or frequency, through an optical fiber in the same direction.

WDM has been used to refer to multiplexing or combining two or four optical signals, while DWDM has been used to refer to multiplexing or combining eight, sixteen, and even forty or more optical signals. Each wavelength of a WDM or DWDM optical signal is a virtual optical channel that may support, for example, data rates of OC-48 at 2.5 Gbps or OC-192 at 9.953 Gbps to provide a significant overall data rate. Optical Erbium-Doped Fiber Amplifiers ("EDFA") are typically used at repeaters to simultaneously and directly boost all wavelengths or virtual optical channels of such WDM or DWDM optical signals. This provides the tremendous advantage of eliminating the requirement of separating each WDM or DWDM optical signal into its various optical signals of different wavelengths, converting each such optical signal to its electrical signal equivalent, amplifying each such electrical signal, and then combining or multiplexing the various signals to regenerate the WDM or DWDM optical signal.

Unfortunately, WDM and DWDM may create wave mixing, such as four-wave mixing, between the various optical signal wavelengths of the WDM or DWDM optical signal. This can increase the Bit Error Rate ("BER") of the optical fiber transmission system. Further, WDM and DWDM optical signals are provided at higher power levels and require optical fibers capable of handling the higher power levels. While it is difficult to design an optical fiber transmission system to accommodate an optical signal at a single wavelength, it is exceedingly more challenging and difficult to design an optical fiber transmission line that can simultaneously accommodate multiple wavelength optical signals, such as WDM and DWDM optical signals.

An optical signal is transmitted in a fiber optic transmission system using, generally, an optical transmitter, which includes a light source or laser, an optical fiber, an optical amplifier, and an optical receiver. A modulated optical signal arriving at an optical receiver must be of sufficient quality to allow the receiver to clearly distinguish the on-and-off pattern of light pulses sent by the transmitter. Noise, attenuation, modal dispersion, chromatic dispersion, chromatic dispersion slope, polarization mode dispersion, and wave mixing are some of the impairments that can distort an optical signal and render the optical signal marginal or unusable at the receiver. The distortion of an optical signal makes it extremely difficult or impossible for an optical receiver to accurately detect or reconstitute the digital signal. This is because distortion nonuniformly broadens, spreads, or widens the various light pulses resulting in such closely spaced pulses or overlapping pulses that the pulses are virtually indistinguishable from one another.

Conventionally, a properly designed fiber optic transmission system or channel can maintain a BER of $10^{-13}$ or better. When an optical channel degrades to a BER of $10^{-8}$, a telecommunications system automatically switches to an alternate optical channel in an attempt to improve the BER. Otherwise, the optical channel operates at a reduced or lower data rate or bandwidth, which harms overall system performance. All types of dispersion, modal, chromatic, and polarization mode, make the BER worse.

The negative effects of modal dispersion have been dramatically reduced and, in some cases, effectively eliminated through the use of single-mode fiber. Single-mode fiber prevents or reduces the ability of an optical signal to take multiple or different paths through an optical fiber. This prevents or reduces multimode distortion. Single-mode fiber allows only a single mode of light to propagate through the fiber. Single-mode fibers generally achieve this through the use of a smaller core, as compared to multimode fibers.

Chromatic dispersion and Polarization Mode Dispersion ("PMD") remain major contributors to distortion of an optical signal, which increases the BER of the optical channel. The distortion caused by chromatic dispersion and polarization mode dispersion generally increases as the bandwidth or data rate increases and as the optical fiber transmission distance increases.

Chromatic dispersion and PMD have been identified as the major contributors to distortion. Chromatic dispersion has received the far greater attention because its adverse effects were initially more limiting at the then available bandwidth and data rate of the leading edge in optical fiber transmission systems. More recently, it has been recognized that PMD is one of the limiting factors that must be overcome to take telecommunications and fiber optic transmission systems to the next level and to continue with the heretofore rapid increase and expansion of bandwidth and data rates. Developments have been made and continue to be made to address problems and limitations caused by PMD.

Chromatic dispersion occurs when the various frequency components or colors that make up a pulse of laser light travel at different speeds through an optical fiber and arrive at the optical receiver at different times. This occurs because the index of refraction of a material, such as an optical fiber, varies with frequency or wavelength. As a result, the various pulses of light that make up an optical signal are distorted through pulse spreading, making it difficult or impossible to accurately receive and recover the digital data contained in the optical signal. Chromatic dispersion presents problems when it is too high and when it is too low. In addition to a distorted optical signal and a reduced data rate, high chromatic dispersion may also result in self phase modulation and generally requires the use of a long dispersion compensating fiber. When chromatic dispersion is too low, the problem of cross-phase modulation may present significant limitations. Thus, it may not be desirable to completely eliminate chromatic dispersion in all cases. Chromatic dispersion may be thought of as the amount of scattering that occurs in the optical signal as it travels through a fiber optic transmission path or medium.

The following single-mode fibers have provided improvements in addressing the problem of chromatic dispersion: (1) Standard Single-Mode Fiber ("SSMF"), (2) Dispersion Shifted Fiber ("DSF"), and (3) modified or Nonzero Dispersion Shifted Fiber ("NZDSF"). The use of Distributed Feedback ("DFB") lasers, which provide narrow output spectra, with these single-mode fibers have resulted in significant improvements and increased bandwidth. DFB lasers provide a light source to use with single-mode optical fibers. DFB lasers produce a light with an extremely narrow distribution of output frequencies and wavelengths. This minimizes the chromatic dispersion problem caused by the fact that different wavelengths travel at slightly different speeds through a fiber.

SSMF, which does not have its chromatic dispersion characteristics shifted, is a single-mode fiber that is implemented in an optical fiber transmission system to account for or reduce the effects caused by chromatic dispersion. SSMF is one of the earliest single-mode fibers and, hence, has a relatively large installed base of infrastructure. As compared to the other single-mode fibers mentioned above, SSMF is the least expensive and was originally designed to reduce or eliminate modal dispersion, as compared to multimode optical fiber. The diameter of the core of SSMF, although still relatively small, is considered large when compared to some of the newer single-mode fibers such as NZDSF. For example, the core area for an SSMF may be 80 $\mu m^2$.

The average chromatic dispersion for SSMF may be relatively high, for example, $$17 \frac{ps}{nm \times km}$$

for a WDM or DWDM optical signal. The average chromatic dispersion ("D") is typically expressed as the chromatic dispersion at the optical wavelength of 1550 nm. When analyzing the chromatic dispersion of an SSMF as compared to optical signal wavelength, the chromatic dispersion curve generally increases, in a nonlinear manner, as the wavelength increases and graphically may generally be represented by a positive slope. An example of SSMF is SMF-28™ optical fiber, which is manufactured by CORNING Incorporated in Corning, N.Y.

Chromatic dispersion may be compensated for in SSMF using an SSMF DCF designed especially for SSMF. For example, assuming an SSMF with an average chromatic dispersion of $$17 \frac{ps}{nm \times km}$$

and a chromatic dispersion slope ("S") of about $$0.055 \frac{ps}{nm^2 \times km},$$

the ratio of D/S is around 309. As such, the SSMF DCF would, ideally, be provided at a ratio of D/S of around 309 so that the addition of the two ratios would be around one to compensate for both D and S of the SSMF. One example of an SSMF DCF used to achieve this would have a D of −90 and an S of $$0.29 \frac{ps}{nm^2 \times km},$$

to achieve the desired ratio of D/S of 309. Unfortunately, it is not always easy to fabricate an SSMF DCF to counteract or compensate for both the chromatic dispersion D and the chromatic dispersion slope S of the SSMF. Further, SSMF DCF is often very long, expensive, and inconvenient or impossible to implement in some applications.

Around 1985, a new single-mode fiber, Dispersion Shifted Fiber ("DSF"), was introduced. DSF, which may also be referred to as standard DSF, was designed so that the zero chromatic dispersion wavelength of the fiber was at or near the minimum attenuation wavelength of the fiber. For example, if the attenuation of an optical signal for a DSF was at a minimum at the wavelength of 1500 nm, the characteristics of the DSF would be established so that the chromatic dispersion of the DSF was at or near zero at this same wavelength of 1500 nm. Because the dispersion characteristics are "shifted" to correspond with the minimum attenuation point, these fibers are referred to as DSFs. When analyzing the chromatic dispersion of a DSF as compared to optical signal wavelength, the chromatic dispersion generally increases, in a nonlinear manner, as the wavelength increases and graphically may generally be represented by a positive slope. Unfortunately, DSFs are relatively expensive and are not particularly advantageous in handling WDM or DWDM optical signals. This is because WDM and DWDM optical signals contain optical signals of many different wavelengths, and, hence, many of these wavelengths are not at the wavelength value of minimum attenuation and near zero chromatic dispersion.

More recently, NZDSF was developed to address some of the limitations of SSMF and DSF, such as chromatic dispersion, and to increase the capability to carry WDM and DWDM optical signals. Some implementations of NZDSF have been optimized to provide a small amount of chromatic dispersion across a broad range of wavelengths. The average chromatic dispersion for NZDSF may be, for example, $$4 \frac{ps}{nm \times km}.$$

As compared to the other single-mode optical fibers discussed herein, the diameter of the core of NZDSF is relatively small. For example, the core area for an NZDSF may be around the range from 50 to 70 $\mu m^2$. The smaller cores of NZDSF may not be able to handle some of the higher power requirements of WDM and DWDM optical signals. Although reduced chromatic dispersion serves to reduce some of the negative effects associated with high chromatic dispersion, unfortunately, even a small amount of chromatic dispersion may serve as an impediment to increased data rates. As mentioned above, low chromatic dispersion may also result in cross-phase modulation.

When analyzing the chromatic dispersion of an NZDSF as compared to optical signal wavelength, the chromatic dispersion generally increases, in a nonlinear manner, as the wavelength increases and graphically may generally be represented by a positive slope. Examples of NZDSF are LEAF™ fiber, which is manufactured by CORNING, Incorporated, and TRUE WAVE™ fiber, which is manufactured by LUCENT TECHNOLOGIES. Even though the average chromatic dispersion of NZDSF is significantly less than that of SSMF, chromatic dispersion, especially in long spans between regenerators or compensators, must be compensated for in NZDSF. Chromatic dispersion is compensated for in NZDSF, similar to SSMF, using an NZDSF DCF designed especially for NZDSF. For example, assuming an NZDSF, such as the TRUE WAVE fiber by LUCENT TECHNOLOGIES, with a D of $$4 \frac{ps}{nm \times km}.$$

and a chromatic dispersion slope S of about $$0.05 \frac{ps}{nm^2 \times km},$$

this results in a ratio of D/S of around 80. To fully compensate, the NZDSF DCF would, ideally, be provided at a ratio of D/S of around 80 so that the combination of the two ratios would be around zero to compensate for both D and S. NZDSF may have a ratio of D/S, for example, in the range of 0 to 100.

Unfortunately the relatively low D and the average to high S of NZDSF makes it very difficult, if not impossible with current technology, to design and engineer an NZDSF DCF with desirable optical characteristics that will fully counteract or compensate for the D and S effects of the NZDSF to produce a residual D and S at or around zero. This is because the relatively low D and the average to high S of NZDSF requires that the NZDSF DCF have either an extremely low D or an extremely large S to fully account for both the D and the S. One example of an NZDSF DCF is one recently made available by LUCENT TECHNOLOGIES for use with LUCENT's TRUE WAVE NZDSF. This NZDSF DCF has a D of −100 and an S of −0.65 to provide a D/S ratio of around 154. As can be seen from the calculations done above, this would not fully compensate for both the D and the S of LUCENT's TRUE WAVE fiber, which has a D/S ratio of 80.

As mentioned above, while it is difficult to design an optical fiber to best accommodate one wavelength, it is significantly more challenging to make a fiber that works well for carrying many simultaneous wavelengths. It has proven exceedingly challenging and difficult to balance all of the various factors and limitations mentioned above to design an optical fiber that can be used to economically and accurately transmit high data rate and high bandwidth WDM or DWDM optical signals. Unfortunately, there are no available optical fibers that provide an adequate solution to this significant problem.

SUMMARY OF THE INVENTION

From the foregoing it may be appreciated that a need has arisen for a composite optical fiber transmission line and method that provides overall improved performance, such as an improved data rate and bandwidth, across a range of optical signal wavelengths, while still maintaining acceptable or minimal levels of chromatic dispersion. In accordance with the present invention, a composite optical fiber transmission line and method are provided that substantially eliminate one or more of the disadvantages and problems outlined above.

According to one aspect of the present invention, a composite optical fiber transmission line is provided for use in an optical fiber transmission system. The composite optical fiber transmission line includes a standard single-mode fiber, such as an SMF-28 fiber, a nonzero dispersion shifted fiber, and a dispersion compensating fiber. The single-mode fiber receives an input optical signal at a first end and generates a single-mode optical signal at a second end. The dispersion shifted fiber receives the single-mode optical signal at a first end and generates an output optical signal at a second end. The dispersion compensating fiber receives the output optical signal and generates a chromatic dispersion compensated optical signal that, preferably, is at some desired residual chromatic dispersion level and residual chromatic dispersion slope. In one example, the residual chromatic dispersion of the composite optical fiber transmission line is zero or near zero, and the residual chromatic dispersion slope of the composite optical fiber transmission line is zero or near zero.

According to another aspect of the present invention, a method for making a composite optical fiber transmission line is provided that includes providing a standard single-mode fiber with a first end, a second end, and a length $L_1$, providing a nonzero dispersion shifted fiber, such as a nonzero dispersion shifted fiber, with a first end, a second end, and a length $L_2$, providing a dispersion compensating fiber with a first end and a length $L_3$, and interfacing the various fibers. The fibers may be interfaced, in one embodiment, by interfacing the second end of the standard single-mode fiber to the first end of the nonzero dispersion shifted fiber, and interfacing the second end of the nonzero dispersion shifted fiber to the first end of the dispersion compensating fiber.

The present invention provides a profusion of technical advantages that include the capability to efficiently and effectively integrate significant portions of existing optical fiber installations and infrastructure of SSMF, such as SMF-28, with new optical fiber installations to provide a composite optical fiber transmission line that significantly increases the overall capacity or bandwidth of an optical fiber transmission system and telecommunications network. This can substantially increase overall network profitability and performance by allowing more information to be transmitted for only a moderate capital investment. The installation of optical fibers is expensive and time consuming and the present invention eliminates the costly proposition of abandoning or not using existing optical fiber installations when installing the next generation of optical fiber to increase overall bandwidth. The present invention provides substantial improvements in both the overall cost and time required to install optical fibers needed to increase bandwidth.

Another technical advantage of the present invention includes the capability to increase the bandwidth or data rate, using existing optical fiber installations with enhancements, by providing desirable optical characteristics that apply over a wide range of optical signal wavelengths. The provides a more robust optical fiber transmission system that is capable of successfully transmitting one or more optical signals having different optical frequencies or wavelengths, such as by using WDM or DWDM optical signals.

Yet another technical advantage of the present invention includes the capability to handle the additional power demand required by higher number of optical channels, such as WDM or DWDM optical signals. As the bandwidth or data rate increases, more power is required to transmit such optical signals. Optical fibers typically require a larger core to handle the increased power demand. The present invention may use existing installations of SSMF fiber to receive an optical signal when its power level or power density is at its highest, and then to use a smaller core NZDSF fiber to propagate the optical signal after the optical signal has attenuated or dissipated somewhat and does not need a larger core fiber. This also reduces wave mixing.

Still yet another technical advantage of the present invention includes a composite fiber with optical properties to reduce self phase modulation, cross phase modulation, decrease the BER and, hence, increase bandwidth, and decrease the need to use a long dispersion compensating fiber.

Still another technical advantage that the present invention provides includes the capability to operate an optical fiber telecommunications system to implement WDM or DWDM optical signals and to use an optical amplifier that can amplify all wavelengths of the optical signal without having to individually convert and amplify all optical wavelengths.

Another technical advantage of the present invention includes the capability to provide a residual chromatic dispersion that is at a desired value, such as zero or near zero, and to provide a residual chromatic dispersion slope that is at a desired value, such as zero or near zero.

The present invention provides all of the advantages of the latest and most advanced optical fiber, including the capability to handle DWDM and extremely fast data rates, while minimizing costs by leveraging the existing large infrastructure of installed SSMF, such as SMF-28.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Although an exemplary implementation of the present invention is illustrated below, the present invention may be implemented using any number of techniques, whether currently known or not yet in existence. The present invention may include many substitute elements and should in no way be limited to the exemplary implementations, drawings, and techniques illustrated below, including the exemplary design and implementation illustrated and described herein.

Figure 1:
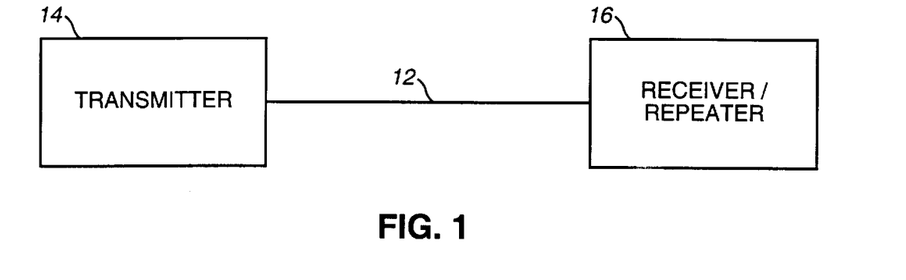
FIG. 1 is a block diagram that illustrates an optical fiber transmission system.

FIG. 1 is a block diagram that illustrates an optical fiber transmission system 10. The optical fiber transmission system 10 includes a composite optical fiber transmission line 12 coupled between a transmitter 14 and a receiver/repeater 16. The transmitter 14 provides an optical signal, such as a one channel optical signal provided at a particular wavelength or a WDM or DWDM optical signal that includes, in effect, multiple optical signals having different wavelengths and carrying different information through two or more optical channels. The optical signal may be provided at virtually any data rate or bandwidth, such as, OC-48 data rate of 2.49 Gbps, OC-192 data rate of 9.95 Gbps, or OC-768 data rate of 39.81 Gbps. These optical signals, as mentioned above, may be provided as a single channel or, preferably will be provided as WDM or DWDM optical signals that include multiple optical signal channels. The transmitter 14 will include a light source, such as a laser light source.

The composite optical fiber transmission line 12 is implemented using two or more optical fibers that are either directly coupled to one another or are in communications with one another. For example, the optical fiber transmission line 12 may include a single-mode optical fiber such as a Standard Single-Mode Fiber ("SSMF"), a Dispersion Shifted Fiber ("DSF"), a Nonzero Dispersion Shifted Fiber ("NZDSF"), or combinations thereof. Although not shown in FIG. 1, if more than one single-mode optical fiber transmission line is included in the composite optical fiber transmission line 12, connectors may be provided to couple such optical fiber portions or segments together.

In a preferred embodiment, the composite optical fiber transmission line 12 is implemented as a single-mode fiber, such as an SSMF-28, a DSF, such as an NZDSF, and a Dispersion Compensating Fiber ("DCF"). The length of each of these optical fibers that make up the composite optical fiber transmission line 12 may be determined by the following equation:

$$\begin{pmatrix} l_1 & l_2 & l_3 \\ D_1 & D_2 & D_3 \\ S_1 & S_2 & S_3 \end{pmatrix} \begin{pmatrix} l_1 \\ l_2 \\ l_3 \end{pmatrix} = \begin{pmatrix} 1 \\ 0 \\ 0 \end{pmatrix}$$

where D refers to the average chromatic dispersion, S refers to the chromatic dispersion slope, and l denotes the length of the particular fiber expressed as a percentage of the total length of the composite optical fiber transmission line 12. This equation or relationship may be referred to as the composite optical fiber transmission line equation. For example, assume that the composite optical fiber transmission line 12 includes a first fiber coupled to the transmitter 14 and made of an SSMF such as SMF-28, and a second fiber that couples to the first fiber and made of an NZDSF, and a third fiber made of a DCF and coupled to the other end of the NZDSF. The first fiber has known optical characteristics $D_1$ and $S_1$, and the second fiber has a known $D_2$ and $S_2$, and the third fiber has a known $D_3$ and $S_3$. As such, the optical fiber transmission line equation, as shown above, may be solved for the three unknowns, i.e., $l_1$, $l_2$, and $l_3$. It should also be noted that if the total length of the composite optical fiber transmission line 12 is known, the length of each of the three fibers may be obtained by multiplying the total length by the appropriate value of $l_1$, $l_2$, and $l_3$.

As is illustrated above by the composite optical fiber transmission line equation, the average chromatic dispersion D is designed to result in a residual chromatic dispersion of zero. Similarly, the composite optical transmission line equation, as shown above, is designed to result in a residual chromatic dispersion slope of zero. This is illustrated by the two zeros provided in the matrix on the right side of the equation. In other embodiments of the present invention, the residual chromatic dispersion and/or the residual chromatic dispersion slope may be designed to result in some known residual chromatic dispersion and/or residual chromatic dispersion slope. In such a case, the matrix on the right side of the composite optical fiber transmission line equation will provide the desired or targeted residual chromatic dispersion and/or residual chromatic dispersion slope. In general, however, the goal is to design the composite optical fiber transmission line 12 in such a manner that the residual chromatic dispersion is at or near zero and the residual chromatic dispersion slope is at or near zero. It should be noted that the third fiber, which will preferably be implemented as a DCF, will be implemented as part of the composite optical fiber transmission line 12, as shown in FIG. 1, or provided within or as part of the receiver/repeater 16 of FIG. 1.

In operation, the optical fiber transmission line 12 receives the optical signal, referred to as an input optical signal, from the transmitter 14 and transmits the optical signal until it is received at the receiver/repeater 16 as an output optical signal. Depending upon the length and optical characteristics of the composite optical fiber transmission line 12, the output optical signal received at the receiver/repeater 16 will be attenuated and distorted as compared to the input optical signal delivered to the composite optical fiber transmission line 12 by the transmitter 14. The distortion of the optical signal is often caused by chromatic dispersion.

The fiber optic transmission system 10 may be either a complete optical fiber transmission system or a segment or portion, such as an optical link between a transmitter/receiver pair or between two repeaters, such as regenerative repeaters, which are used to amplify and provide any needed compensation or regeneration to the optical signal, of a larger optical fiber transmission system of a larger telecommunications network. If the fiber optic transmission system 10 is illustrated as an optical link between two regenerative repeaters, the transmitter 14 and the receiver/repeater 16 will be implemented as repeaters. One embodiment of the receiver/repeater 16 is illustrated in FIG. 2 and is discussed more fully below in connection therewith.

It should be noted that the various items shown as included as part of the receiver/repeater 16 may exist as separate network elements and do not necessarily have to be grouped or considered as part of the receiver/repeater 16. For example, the receiver/repeater 16 may include a DCF that may be illustrated as part of receiver/repeater 16 or as part of the optical fiber transmission line 12. The transmitter 14 is often implemented as part of a receiver/transmitter pair and may be able to handle bidirectional optical signaling traffic.

Figure 2:
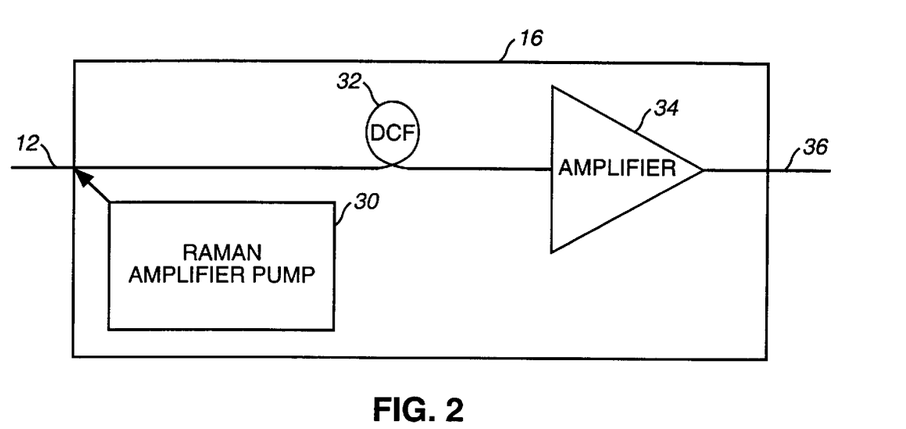
FIG. 2 is a block diagram that illustrates one embodiment of a receiver/repeater of the optical fiber transmission system.

FIG. 2 is a block diagram that illustrates one embodiment or implementation of the receiver/repeater 16 of the optical fiber transmission system 10. The receiver/repeater 16 includes a Raman amplifier pump 30, which interfaces with the optical fiber transmission line 12, which is used to increase the signal to noise ratio of the output optical signal, a Dispersion Compensating Fiber ("DCF") 32, and an amplifier 34. The receiver/repeater 16 receives the output optical signal from the optical fiber transmission line 12 and provides it to a DCF 32 where the output optical signal is received by the DCF 32 so that a chromatic dispersion compensated optical signal is generated at the output of the DCF 32. The chromatic dispersion compensated optical signal is then provided to the amplifier 34 where the signal is amplified to account for any attenuation or low signal strength.

In a preferred embodiment of the receiver/repeater 16, the Raman amplifier pump 30 interfaces with an NZDSF, which has a relatively small core and relatively low average chromatic dispersion D compared to a larger core SSMF, which results in the Raman amplifier pump 30 being more efficient and having a higher gain. The DCF 32 is preferably provided as an optical fiber that is relatively short in length as compared to the optical fiber transmission line 12 and that exhibits an average chromatic dispersion D and a chromatic dispersion slope S as defined by the ratio of D/S in a range from around 100 to around 200, and preferably around 150. The average chromatic dispersion D may be any of a variety of values such as a negative $$100 \; \frac{\text{ps}}{\text{nm} \times \text{km}}.$$

In a preferred embodiment, the amplifier 34 will be implemented as an optical Erbium-Doped Fiber Amplifier ("EDFA") that may be used in a receiver or in a repeater to simultaneously and directly boost all wavelengths or virtual optical channels of the chromatic dispersion compensated optical signal provided by the DCF 32 to the amplifier 34. The amplifier 34 will preferably be provided as an EDFA when the chromatic dispersion compensated optical signal is provided as a WDM or DWDM optical signal. As mentioned above, an EDFA provides the tremendous advantage of eliminating the requirement of converting the WDM or DWDM optical signal into its electrical equivalent signals before amplifying. The amplifier 34 generates an amplified chromatic dispersion compensated optical signal and provides it as an output of the receiver/repeater 16. If the receiver/repeater 16 is acting as a repeater, the amplified chromatic dispersion compensated optical signal may be provided to an optical fiber transmission line 36 for further transmission. In other embodiments, the receiver/repeater 16 may include the capability or circuitry to decode the information contained in the chromatic dispersion compensated optical signal. In still other embodiments, the receiver/repeater 16 may be implemented as a regenerative repeater.

Figure 3:
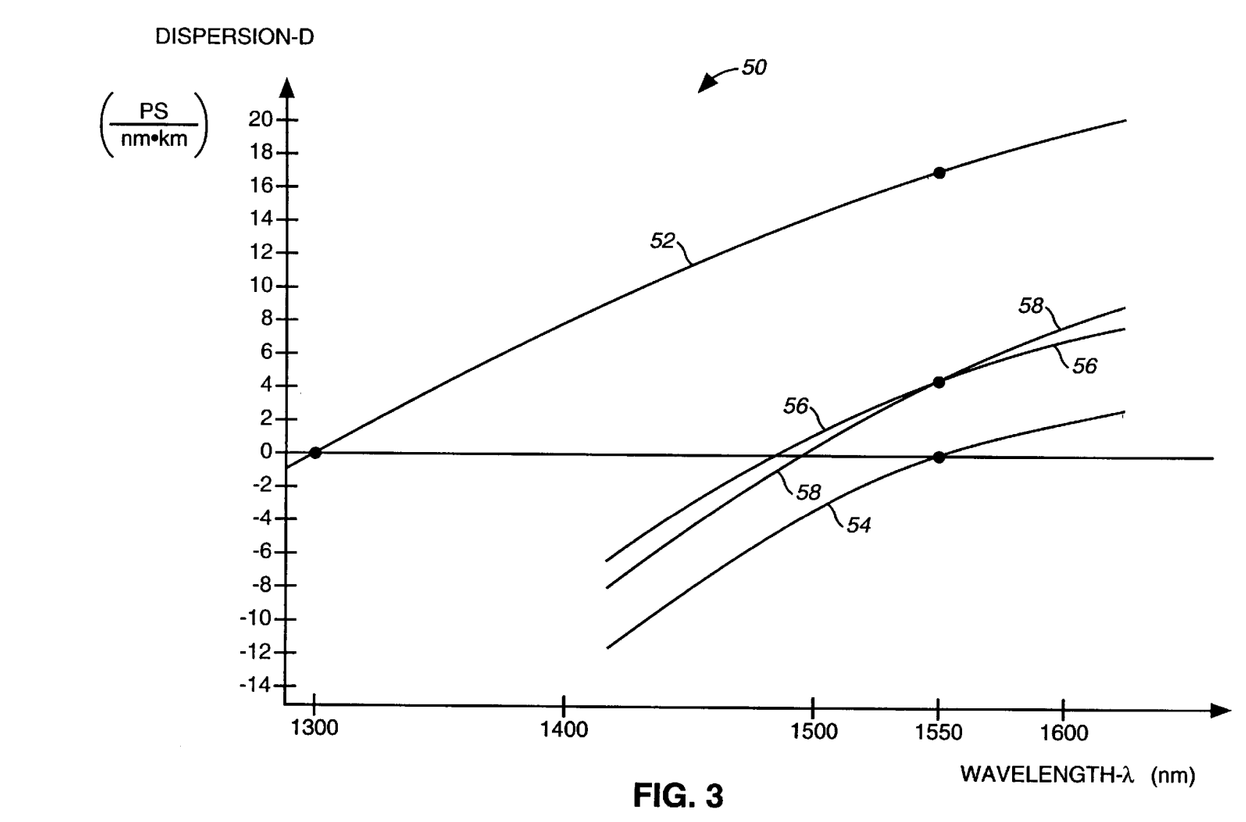
FIG. 3 is a graph that illustrates exemplary chromatic dispersion curves for various optical wavelengths and for various types of optical fiber transmission lines.

FIG. 3 is a graph 50 that illustrates exemplary chromatic dispersion curves versus optical wavelengths for various types of optical fiber transmission lines that may be implemented in the present invention. The graph 50 includes an SSMF chromatic dispersion curve 52, a DSF chromatic dispersion curve 54, an NZDSF chromatic dispersion curve 56, and an NZDSF chromatic dispersion curve 58. It should be noted that the various chromatic dispersion curves shown in FIG. 3 are approximations and are all in reality nonlinear and thus are not straight lines. As such, the chromatic dispersion slope S information necessarily includes some level of approximation and will generally be in reference to a specified range of optical wavelengths where it can be assumed that the chromatic dispersion curve is linear or somewhat linear within this region. As is illustrated by the graph 50, chromatic dispersion varies with the optical wavelength of the optical signal.

The SSMF chromatic dispersion curve 52 is shown with a D of zero at 1300 nm and a D of 17 at 1550 nm. It should be noted that the optical band from 1520 mm to 1560 mm may be referred to as the erbium band. The chromatic dispersion slope S may be around $$0.055 \; \frac{ps}{nm^2 \times km}$$

at or around 1550 mm. The DSF chromatic dispersion curve 54 is shown such that its average chromatic dispersion D is zero at 1550 nm. It may have a chromatic dispersion slope S of around $$0.085 \; \frac{ps}{nm^2 \times km}$$

at or around 1550 nm. As can be seen in FIG. 3, all of the various chromatic dispersion curves generally have a positive slope.

The NZDSF chromatic dispersion curve 56 and the NZDSF chromatic dispersion curve 58 are both shown with an average chromatic dispersion D of 4 at 1550 nm. These curves, however, have different chromatic dispersion slopes S at or around 1550 nm. The NZDSF chromatic dispersion curve 56 has a lower slope than the NZDSF chromatic dispersion curve 58. In one embodiment, the NZDSF chromatic dispersion curve 56 represents the chromatic dispersion curve for the TRUE WAVE fiber by LUCENT TECHNOLOGIES, while the NZDSF chromatic dispersion curve 58 illustrates the chromatic dispersion curve of the LEAF fiber by CORNING. The NZDSF chromatic dispersion curve 56 may exhibit a chromatic dispersion slope S of $$0.05 \; \frac{ps}{nm^2 \times km}$$

at or around 1550 nm, while the NZDSF chromatic dispersion curve 58 may exhibit a chromatic dispersion slope of $$0.085 \; \frac{ps}{nm^2 \times km}$$

at or around 1550 nm.

A summary of the various optical characteristics of the four chromatic dispersion curves illustrated in FIG. 3 are shown in the following tables:

TABLE 1

| Optical Fiber | D | S | D/S |
|---|---|---|---|
| SSMF (52) | 17 | 0.055 | 309 |
| NZDSF (58) | 4 | 0.085 | 47 |
| NZDSF (56) | 4 | 0.05 | 80 |
| DSF (54) | 0 | 0.085 | 0 |
| DCF (MR) | −100 | 0.65 | 154 |

TABLE 2

| Optical Fiber Combination | $t_1$ (SSMF(52)) | $t_2$ (NZDSF or DSF) | $t_3$ (DCF(MR)) | Residual D | Residual S |
|---|---|---|---|---|---|
| SSMF(52) + NZDSF(58) + DCF(MR) | 0.46 | 0.44 | 0.10 | 0 | 0 |
| SSMF(52) + NZDSF(56) + DCF(MR) | 0.28 | 0.65 | 0.07 | 0 | 0 |
| SSMF(52)+ DSF(54)+ + DCF(MR) | 0.55 | 0.36 | 0.09 | 0 | 0 |

Referring now to Table 1, representative or example data are provided that reflect or approximate the chromatic dispersion curves of FIG. 3. For example, the chromatic dispersion curve 52, may be the same or similar to the SMF-28 fiber that is manufactured by CORNING and has an average chromatic dispersion D of 17 and a chromatic dispersion slopes of around 0.055 at a wavelength of 1550 nm. The ratio of D/S for these valves is about 309. The NZDSF chromatic dispersion curve 58 provides an average chromatic dispersion of four and a chromatic dispersion slope S of 0.085 at 1550 nm. The ratio of D/S is 47 for this optical fiber. Similarly, the NZDSF chromatic dispersion curve 56 provides an average D of four and a chromatic dispersion slope S of 0.05 at 1550 nm. This results in a D/S ratio of 80. Finally, the DSF chromatic dispersion curve 54 provides an average D of 0 and a chromatic dispersion slope of 0.085, which results in a D/S ratio of 0.

The last row of Table 1 provides some illustrative values for a DCF with a medium D/S ratio. The designation MR refers to this medium ratio. In Table 1, the average D of the DCF-MR is shown as being negative 100 and the chromatic dispersion slope S is shown as negative 0.65. This results in a D/S ratio of 154, which may be designated as a medium ratio. The DCF-MR chromatic dispersion curve is not shown in FIG. 3.

Referring now to Table 2, various examples of composite optical fiber transmission lines are shown that include a combination of an SSMF and either an NZDSF or a DSF. This data uses the data provided above in Table 1 and is provided in the composite optical fiber transmission line equation to provide a composite optical fiber transmission line with a residual chromatic dispersion at or near zero and a residual slope at or near zero. For example, the first row of Table 2 illustrates the combination of an SSMF, with the optical characteristics of the chromatic dispersion curve 52, and an NZDSF, with the optical characteristics of the chromatic dispersion curve 58, and a DCF, with the optical characteristics of the DCF (MR) shown above in Table 1. By utilizing the composite optical fiber transmission line equation and the known dispersion and slope characteristics, $l_1$, $l_2$, and $l_3$ may be calculated to provide a residual D and a residual S of zero.

The same calculation is done and is illustrated in rows 2 and 3 of Table 2 for the combination of optical fibers to create a composite optic fiber transmission line having SSMF (52), NZDSF (56), and DCF (MR), as illustrated in row 2, and a composite optical fiber transmission line that includes SSMF (52), DSF (54) and DCF MR) as illustrated in the row 3 of Table 2. The capability to provide the composite optical fiber transmission line with a residual D that is at or near zero for several or multiple wavelengths i.e., a residual S of zero, provides the substantial advantages of the present invention. This allows higher data rates to be carried by the composite optical fiber transmission line by using WDM or DWDM signals, which include multiple optical signals having different wavelengths. This also provides the significant advantage of allowing substantial portions of existing installations of optical fiber, such as SFM-28, to be used without having to install entirely new optical fiber.

FIGS. 4a and 4b include a graph 70 and a graph 72 that illustrate the effects of an optical fiber transmission line on an optical signal 82 of a wavelength $\lambda 1$ and an optical signal 84 of a wavelength $\lambda 2$, when the residual chromatic dispersion slope of the optical fiber transmission line is not zero and when the residual chromatic dispersion slope is at or near zero. The graph 70 of FIG. 4a illustrates the situation where the residual chromatic dispersion is not zero for each optical wavelength, and, hence, the residual chromatic dispersion slope of the optical fiber transmission line is not zero. The graph 72 of FIG. 4b is an example of the situation when the residual chromatic dispersion slope of the optical fiber transmission line is zero is shown in the graph 72 of FIG. 4b.

Referring now to the graph 70 of FIG. 4a, the optical signal 82 is shown returning to a zero chromatic dispersion value after each compensation point 74, 76, 78, and 80, when the DCF is applied. Concurrently, the optical signal 84 at wavelength $\lambda 2$ is shown having its chromatic dispersion reduced, but not eliminated to zero, at each compensation point where the DCF is used to reduce the effects or compensate for the effects of chromatic dispersion.

Figure 4:
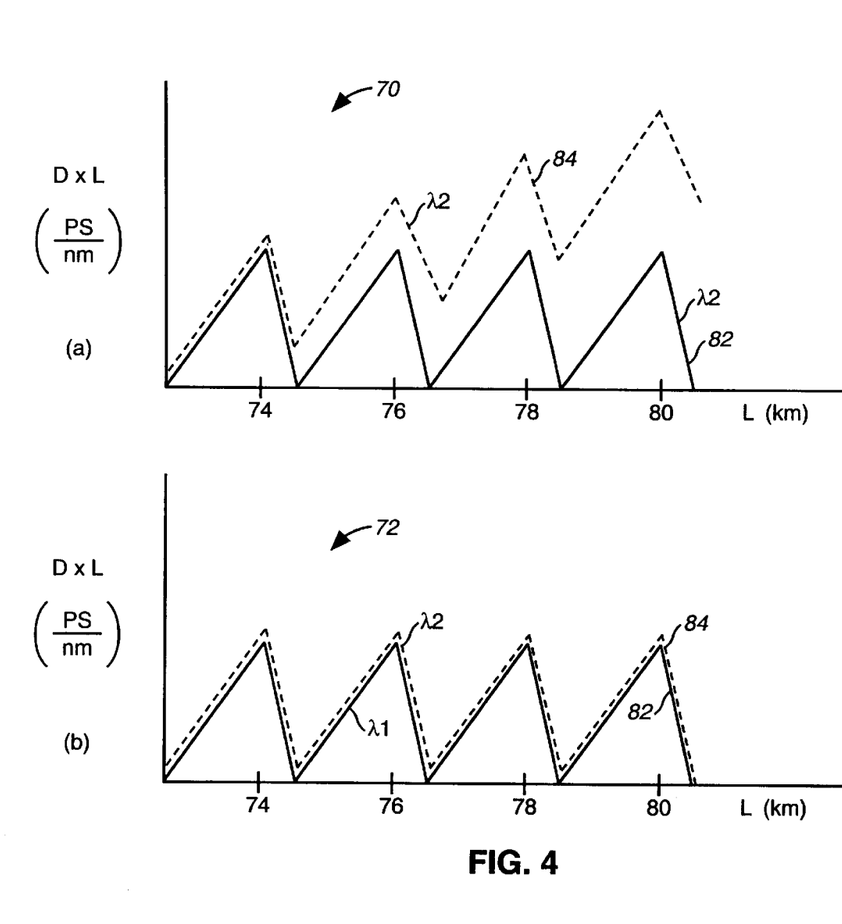
FIGS. 4a and 4b are graphs that illustrate the effects of an optical fiber transmission line on an optical signal of a wavelength $\lambda_1$ and an optical signal of a wavelength $\lambda_2$ when the residual chromatic dispersion slope of the optical fiber transmission line is not zero and when it is at or near zero.
Figure 5:
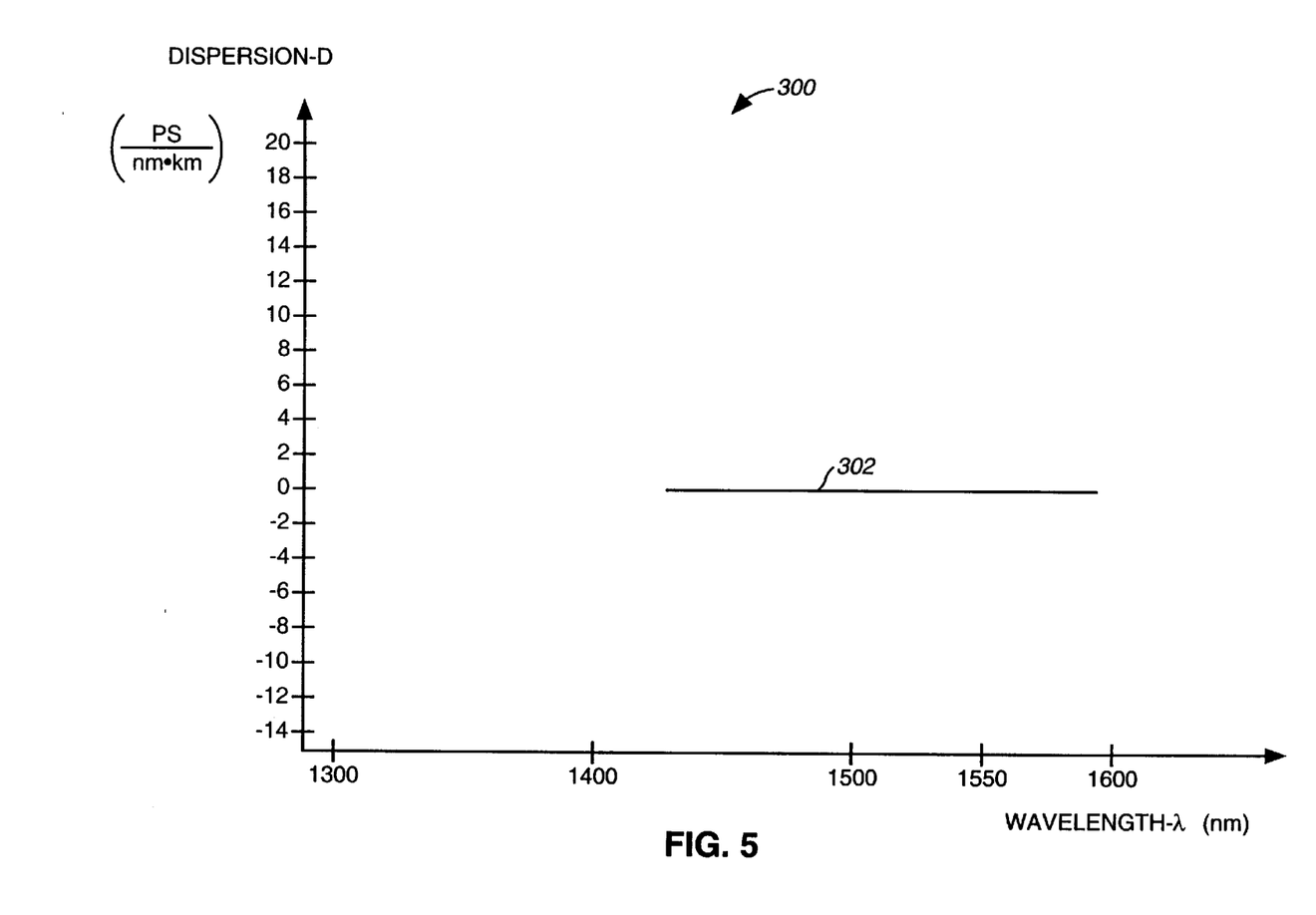
FIG. 5 is a graph that illustrates an exemplary chromatic dispersion curve for various optical wavelengths for a composite optical fiber transmission line that provides a desired residual chromatic dispersion of at or near zero and a residual chromatic dispersion slope of at or near zero.

The graph 72 illustrates the same optical signals 82 and 84 as graph 70 except that the DCF is provided at a desired average chromatic dispersion value and a chromatic dispersion slope value according to the composite optical fiber transmission line equation to result in a residual D and residual S of zero. This is illustrated in the graph 72 by the optical signal 82 and 84 both returning to a zero or near zero chromatic dispersion value after DCF is provided at each compensation point 74, 76, 78, and 80. FIG. 5 is a graph 300 that illustrates an exemplary chromatic dispersion curve 302 for various optical wavelengths for a composite optical fiber transmission line of the present invention that provides a desired residual chromatic dispersion of at or near zero and a residual chromatic dispersion slope of at or near zero. As seen from the graph 300, the residual chromatic dispersion of an optical signal that passes through the composite optical fiber transmission line results in zero or near zero chromatic dispersion. This is especially advantageous for high data rate or high bandwidth optical signals, such as WDM or DWDM optical signals. As compared to the two wavelengths illustrated in FIG. 4, the exemplary chromatic dispersion curve 302 would result in a compensation of the chromatic dispersion to a value that is at or near zero, similar to what is shown in FIG. 4b.

Figure 6:
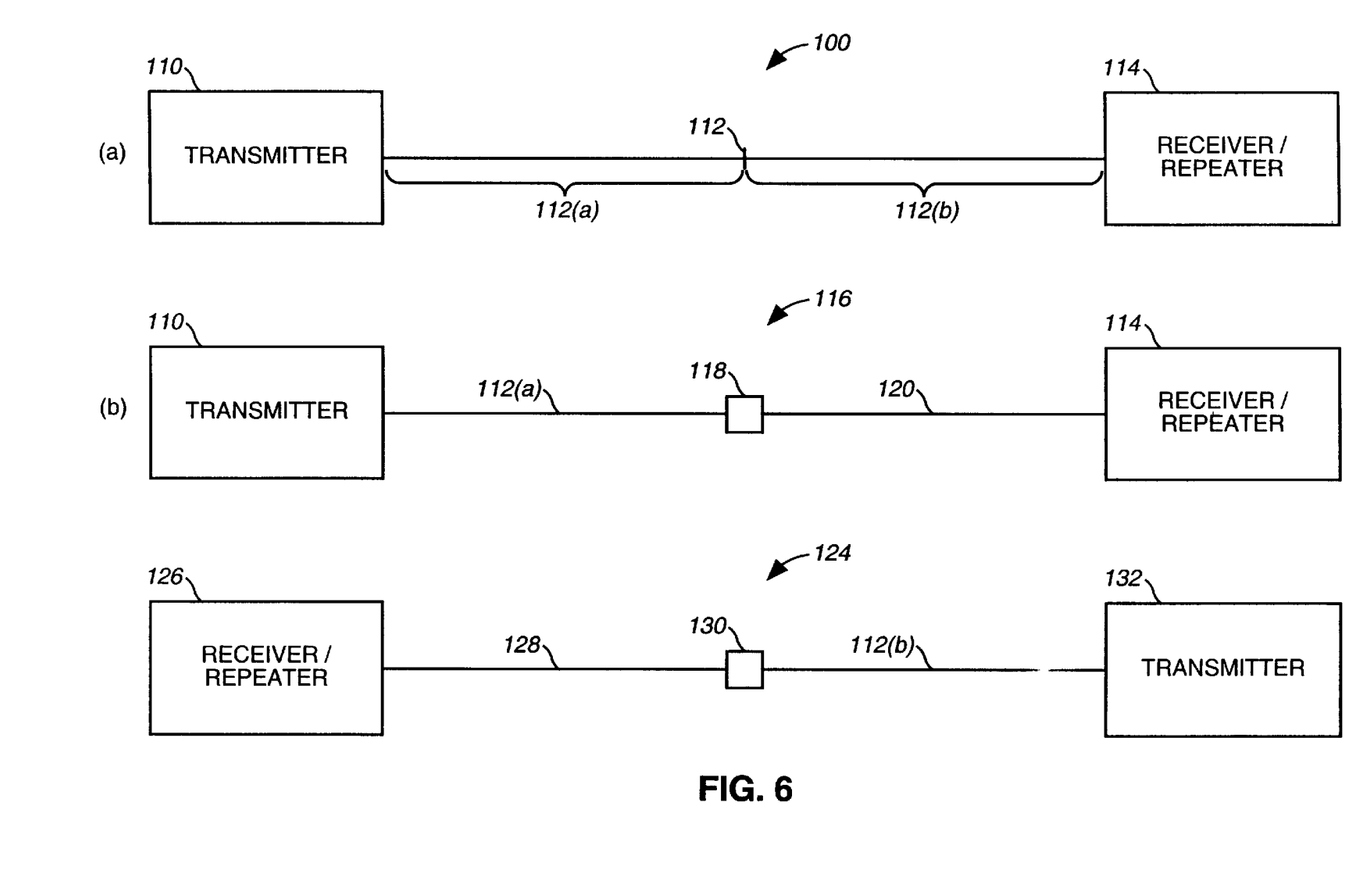
FIGS. 6a and 6b are block diagrams that illustrate the use of an existing installation of SSMF of an optical fiber transmission system to create an optical fiber transmission system that uses a composite optical fiber transmission line.

FIGS. 6a and 6b are block diagrams that illustrate the use of an existing installation of SSMF 112 in FIG. 6a of an optical fiber transmission system 100 to create an optical fiber transmission system 116 and/or 124, as shown on FIG. 6b, that uses the SSMF 112 to create a composite optical fiber transmission line according to an embodiment of the present invention.

There are many existing installations of optical fiber transmission systems, similar to the optical fiber transmission system 100, that include the use of SSMF 112, such as SMF-28. The optical fiber transmission system 100 includes a transmitter 110, the SSMF 112, and a receiver/repeater 114. The receiver/repeater 114 may be simply a repeater, such as a regenerative repeater, or may be a receiver, as was previously discussed in connection with FIG. 1. In one embodiment, the DCF of the optical fiber transmission system 100 can be part of the receiver/repeater 114. In other embodiments, the DCF may be implemented as part of the SSMF 112 or external to the receiver/repeater 114. The SSMF 112 receives the input optical signal from the transmitter 112 and generates a single-mode optical signal, which is provided to the receiver/repeater 114. The generation of the single-mode optical signal is a result of the chromatic dispersion properties introduced into the input optical signal by the optical characteristics of the SSMF 112.

A DCF, which is in communication with the SSMF 112, receives the single-mode optical signal and generates a chromatic dispersion compensated optical signal. As mentioned above, the DCF may be included as part of the receiver/repeater 114 or it may reside separately. The receiver/repeater 114 then receives or further processes the chromatic dispersion compensated optical signal.

Referring now to the two optical fiber transmission systems of FIG. 6b, a first optical fiber transmission system 116 and a second optical fiber transmission system 124 are illustrated. The first optical fiber transmission system 116 includes the transmitter 110 in communication with the receiver/repeater 114 through a composite optical fiber transmission line according to the present invention. The composite optical fiber transmission line of the first optical fiber transmission system 116 includes a first SSMF portion 112(*a*), which is provided from the SSMF 112 of FIG. 6a, coupled to a DSF, such as an NZDSF 120, through an optical interface or coupling 118.

The second optical fiber transmission system 124 includes a transmitter 132 in communication with a receiver/repeater 126 through a composite optical fiber transmission line. This composite optical fiber transmission line includes a second SSMF portion 112(*b*) of the SSMF 112 coupled to an NZDSF 128 through an optical interface or coupling 130. As is illustrated, the optical fiber transmission system 100, using the existing installation of SSMF 112, has been converted from a unidirectional system to a high bandwidth, bidirectional optical fiber transmission system, including the first optical fiber transmission system 116 and the second optical fiber transmission system 124. It should be understood that the present invention may also be implemented in both terrestrial optical fiber transmission systems and underwater optical fiber transmission systems.

It should be noted that the portions of the SSMF 112 that are used in the two systems of FIG. 6b are positioned next to a transmitter. This provides a significant advantage that will be discussed more fully below and further illustrated in connection with FIG. 8. This advantage allows for higher power optical signals, such as WDM and DWDM optical signals, to be provided to a larger core SSMF at a time when the optical signal is at a higher power level and before the signal has been attenuated by propagation through the SSMF. By the time such an optical signal reaches the DSF or NZDSF of the composite optical fiber transmission line, the attenuation has reduced the power level and the corresponding need for a larger core fiber. This provides the capability to use the NZDSF 120 and the NZDSF 128, which have a smaller core than the SSMF 112.

Figure 7:
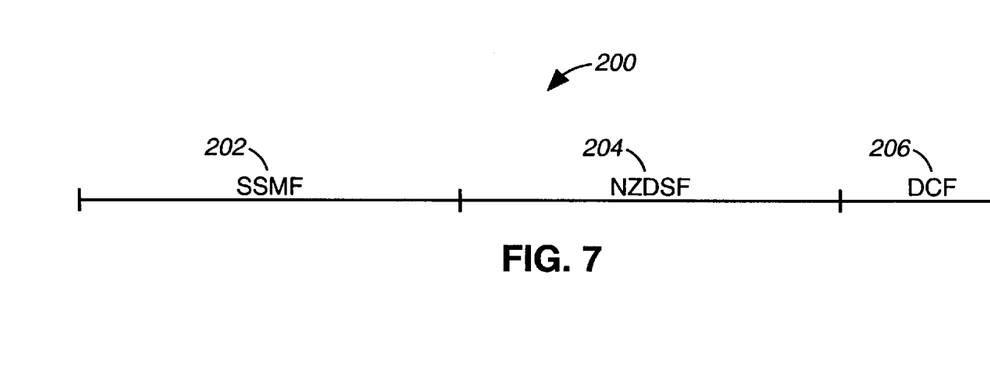
FIG. 7 is a line diagram that illustrates a composite optical fiber transmission line.

FIG. 7 is a line diagram that illustrates a composite optical fiber transmission line 200 according to an embodiment of the present invention. The composite optical fiber transmission line 200 includes an SSMF portion 202, an NZDSF portion 204, and a DCF portion 206. The relative lengths of each such portion reflects one possible solution to the composite optical fiber transmission line equation that results in a residual chromatic dispersion and a residual chromatic dispersion slope of at or near zero or at or near some other desired value. In an alternative embodiment, the NZDSF portion 204 may be implemented as a DSF 204 using a standard DSF.

Referring back to Table 1 and Table 2 above, the total length of the composite optical fiber transmission line 200 may include any of a variety of values. For example, the SSMF portion 202 may be provided at 46%, 45%, 28%, 55%, or some other percentage of the total length of the composite optical transmission line 200. Similarly, the NZDSF portion 204 may be provided at 44%, 45%, 65%, 36%, or any of a variety of other percentages of the total length of the composite optical fiber transmission line 200. The DCF portion 206 is shown in Table 2 above to include a length that is anywhere from 7% to 10% of the total length of the composite optical fiber transmission line 200. It should be understood that these percentages are examples only and depending upon the various D and S values, the length of the various portions of the composite optical fiber transmission line may vary.

Additional examples of the various values of the ratio of D/S may include, for example, 250 to 350 for the SSMF portion 202, 0 to 100 for the NZDSF portion 204, and 100 to 200 for the DCF portion 206. The various portions of the composite optical fiber transmission line 200 may be interfaced or coupled either directly or through some other arrangement. As long as the input optical signal may be communicated between each of the portions of the composite optical fiber transmission line 200, the present invention may be achieved. In general, the core of the SSMF portion 202 will be larger than the core of the NZDSF portion 204. This allows the SSMF portion 202 to better serve as the portion of the composite optical fiber transmission line 200 that first receives a higher power optical signal, such as a WDM or DWDM signal, because the SSMF portion 202 is better capable of handling these higher powered signals. This helps with wave mixing such as four wave mixing, cross phase mixing, and self-phase mixing. In other embodiments, however, this could be reversed.

In one embodiment, the SSMF portion 202 comprises the SMF-28, the NZDSF portion 204 includes either the LEAF fiber or the TRUE WAVE fiber, and the DCF portion 206 comprises the DCF manufactured by LUCENT TECHNOLOGIES to be used with the TRUE WAVE fiber.

Figure 8:
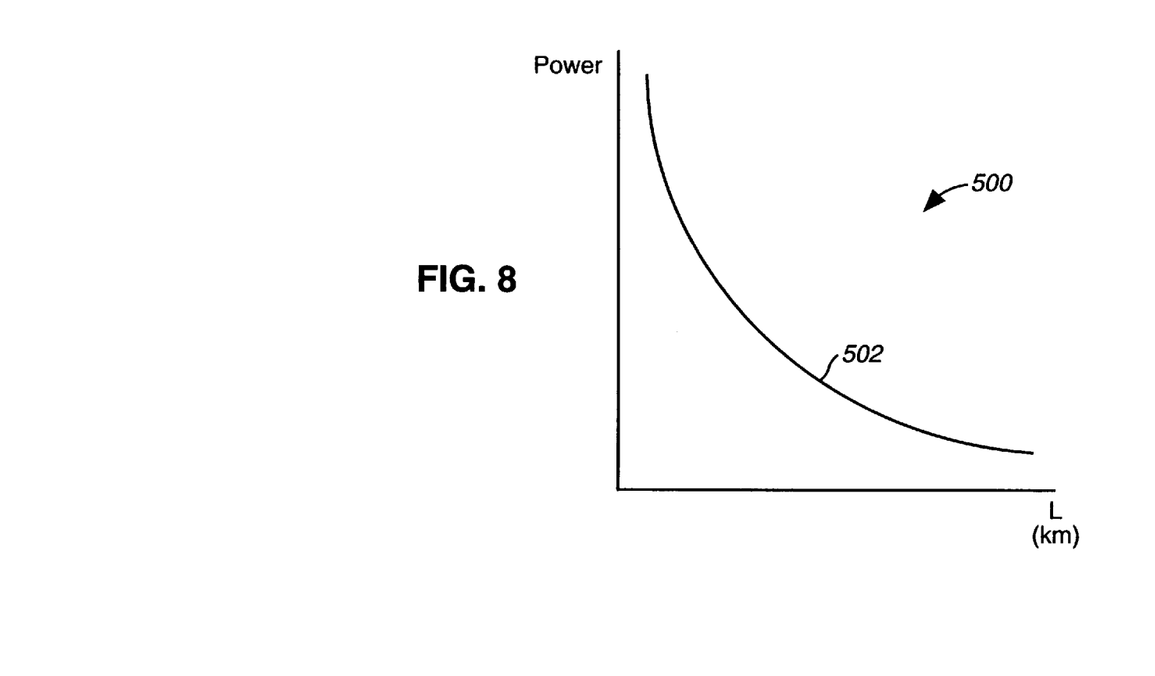
FIG. 8 is a graph that illustrates an optical signal power attenuation curve for distances of propagation through an optical fiber transmission line.

FIG. 8 is a graph 500 that illustrates an optical power attenuation curve 502 for distances of propagation through an optical fiber transmission line. As is illustrated, the power level of the optical signal is higher initially and is reduced through attenuation as the optical signal travels or propagates through the optical fiber transmission line, such as the composite optical fiber transmission line of the present invention. The present invention, in one embodiment, provides that the SSMF portion of the composite optical fiber transmission line is provided when the optical signal is at a higher power level. In this manner, wave mixing and associated problems may be significantly reduced to provide substantial advantages.

Figure 9:
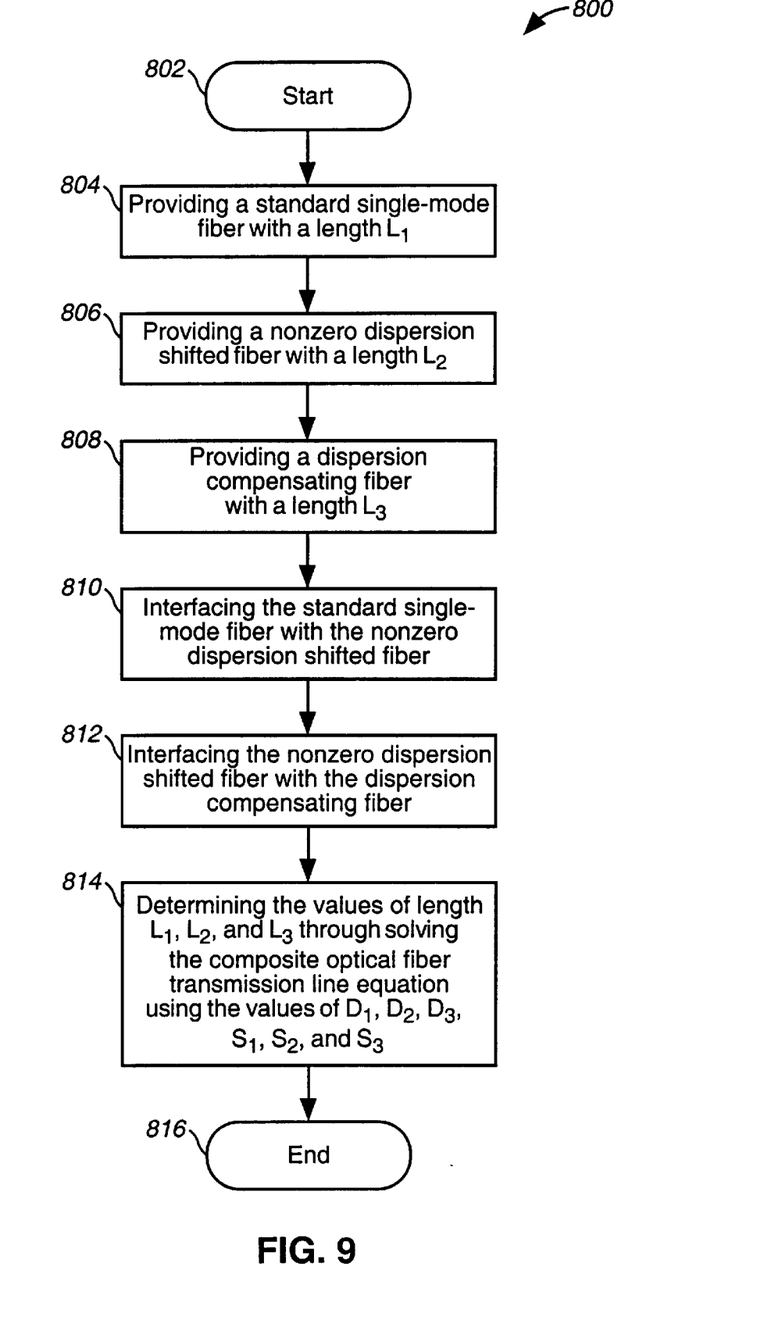
FIG. 9 is a flowchart that illustrates a method for making a composite optical fiber transmission line.

FIG. 9 is a flow chart that illustrates a method 800 for making a composite optical fiber transmission line. The method 800 begins at 802 and proceeds next to block 804 where an SSMF is provided with a length $L_1$. The method 800 proceeds next to block 806 where an NZDSF is provided with a length $L_2$. Next, the method 800 proceeds to block 808 where a DCF is provided with a length $L_3$. Preferably, the SSMF will be provided as SMF-28, which has an existing large installation base throughout the world and will provide considerable cost savings by utilization of SMF-28 by eliminating the need to reinstall such optical fiber. In another preferred embodiment, the ratio of the average chromatic dispersion D and the chromatic dispersion slope S of each of the various fibers is provided at a value within the following ranges:

| Optical Fiber | General Range of D/S |
|---|---|
| SSMF | around 250 to around 350 |
| NZDSF | around 0 to around 100 |
| DCF | around 100 to around 200 |

It should be understood, however, that even though preferred ranges have been given for each of these various fibers that may be used to make up the composite optical fiber transmission line of the present invention, other values and ranges of D/S may be used and still fall within the scope of the present invention.

The method 800 then proceeds to block 810 where one end of the SSMF is interfaced or coupled with one end of the NDSF. It should be noted that the interfacing of these two fibers may be either through a direct coupling or through one or more intermediate devices or connections. At block 812, the other end of the NZDSF is interfaced with one end of the DCF. Once again, this may occur through a variety of means such as through a direct optical coupling or through intermediate devices or interfaces.

Method 800 then proceeds to block 814 where the composite optical fiber transmission line equation is applied to determine the various lengths $L_1$, $L_2$, and $L_3$ (or $l_1$, $l_2$, or $l_3$). This assumes in block 814 that the values of $D_1$, $D_2$, $D_3$, $S_1$, $S_2$, and $S_3$ are known. Further, the total length of the entire composite optical fiber transmission line may also be known or given. Method 800 then concludes at 816.

In one embodiment of the composite optical fiber transmission line, the SSMF and the NZDSF may each constitute about 45% of the total length of the composite optical fiber transmission line, while the DCF comprises about 10% of the total length of the composite optical fiber transmission line. It should be understood that the method 800 relies on the solution of the deposit optical fiber transmission line equation to make or manufacture a composite optical transmission line that results in a residual chromatic dispersion and a chromatic dispersion slope that is at or near zero (or some other desired valued). As such, the composite optical fiber transmission line equation may be solved for any combination of three unknown variables such as $D_1$, $D_2$, $D_3$, $S_1$, $S_2$, $S_3$, $l_1$, $l_2$, and $l_3$. Please note that $l_1$, $l_2$ and $l_3$ can be converted to $L_1$, $L_2$, and $L_3$, once the desired total length of the composite optical fiber transmission line is known or is provided at a desired value.

Thus, it is apparent that there has been provided, in accordance with the present invention, a composite optical fiber transmission line and method that provides improved performance and that satisfies one or more of the advantages set forth above. The present invention provides improved optical fiber characteristics such as, for example, one or more of the following: improved data rate or bandwidth capability across a range of wavelengths, zero or small residual average chromatic dispersion, zero or minimal chromatic dispersion slope, and reduced susceptibility to wave mixing, such as four-wave mixing. Although the preferred embodiment has been described in detail, it should be understood that various changes, substitutions, and alterations can be made herein without departing from the scope of the present invention, even if all of the advantages identified above are not present. For example, the composite fiber and method may be implemented using existing installations of SSMF or new installations. Also, the techniques, systems, sub-systems, and methods described and illustrated in the preferred embodiment as discrete or separate may be combined or integrated with other systems, modules, techniques, or methods without departing from the scope of the present invention. For example, the SSMF and the NZDSF may be directly coupled to each other or could be coupled through some other interface, such that the SSMF and the NZDSF are not considered directly coupled to each other but may still be in communication with one another.

Other examples of changes, substitutions, and alterations are readily ascertainable by one skilled in the art and could be made without departing from the spirit and scope of the present invention.

What is claimed is:

1. A composite optical fiber transmission line comprising:
   a single-mode fiber operable to receive an input optical signal at a first end and to output a single-mode optical signal at a second end;
   a dispersion shifted fiber in communication with the single-mode fiber and operable to receive the single-mode optical signal at a first end and to output an output optical signal at a second end; and
   a dispersion compensating fiber in communication with the dispersion shifted fiber and operable to receive the output optical signal and to output a chromatic dispersion compensated optical signal.

2. The composite optical fiber transmission line of claim 1, wherein the single-mode fiber is a standard single-mode fiber.

3. The composite optical fiber transmission line of claim 2, wherein the dispersion shifted fiber is a nonzero dispersion shifted fiber.

4. The composite optical fiber transmission line of claim 3, wherein the standard single-mode fiber exhibits an average chromatic dispersion of $D_1$, a chromatic dispersion slope of $S_1$, a ratio of $D_1/S_1$ in a range from around 250 to around 350, and is provided at a length $L_1$, wherein the nonzero dispersion shifted fiber exhibits an average chromatic dispersion of $D_2$, a chromatic dispersion slope of $S_2$, and is provided at a length $L_2$, wherein the dispersion compensating fiber exhibits an average chromatic dispersion of $D_3$, a chromatic dispersion slope of $S_3$, a ratio of $D_3/S_3$ that is in a range defined from around 100 to around 200, and is provided at a length $L_3$.

5. The composite optical fiber transmission line of claim 3, wherein the values of length $D_2$, $S_2$, and $L_2$ are determined through the solution of the composite optical fiber transmission line equation, while the values of $D_1$, $D_3$, $S_1$, $S_3$, $L_1$ and $L_3$ are known.

6. The composite optical fiber transmission line of claim 3, wherein the input optical signal is a WDM optical signal.

7. The composite optical fiber transmission line of claim 3, wherein the input optical signal is a DWDM optical signal.

8. The composite optical fiber transmission line of claim 3, wherein the standard single-mode fiber was previously installed and in operation before the nonzero dispersion shifted fiber was installed and in operation.

9. The composite optical fiber transmission line of claim 3, wherein the standard single-mode fiber is coupled directly to the nonzero dispersion shifted fiber.

10. The composite optical fiber transmission line of claim 3, wherein the standard single-mode fiber is in communication with the nonzero dispersion shifted fiber but are not directly coupled to one another.

11. The composite optical fiber transmission line of claim 3, wherein the standard single-mode fiber has a larger core than the core of nonzero dispersion shifted fiber.

12. The composite optical fiber transmission line of claim 3, wherein the standard single-mode fiber has a larger average chromatic dispersion than the average chromatic dispersion of the nonzero dispersion shifted fiber.

13. The composite optical fiber transmission line of claim 3, wherein the standard single-mode fiber has a high enough chromatic dispersion to eliminate or limit wave mixing.

14. The composite optical fiber transmission line of claim 3, wherein the total length of the composite optical fiber transmission line includes about 45 percent of the standard single-mode fiber, about 45 percent of the nonzero dispersion shifted fiber, and about 10 percent of the dispersion compensating fiber.

15. The composite optical fiber transmission line of claim 3, wherein the total length of the composite optical fiber transmission line includes about 47 percent of the standard single-mode fiber, about 43 percent of the nonzero dispersion shifted fiber, and about 10 percent of the dispersion compensating fiber.

16. The composite optical fiber transmission line of claim 3, wherein the length of the standard single-mode fiber and the length of the nonzero dispersion shifted fiber are about equal.

17. The composite optical fiber transmission line of claim 3, wherein the dispersion compensating fiber is a relatively short length as compared to the length of the standard single-mode fiber and the length of the nonzero dispersion shifted fiber.

18. The composite optical fiber transmission line of claim 3, wherein the standard single-mode fiber exhibits an average chromatic dispersion of D, a chromatic dispersion slope of S, and a ratio of D/S of around 300.

19. The composite optical fiber transmission line of claim 3, wherein the standard single-mode fiber exhibits an average chromatic dispersion of $D_1$, a chromatic dispersion slope of $S_1$, and a ratio of $D_1/S_1$ in a range from around 250 to around 350, wherein the nonzero dispersion shifted fiber exhibits an average chromatic dispersion of $D_2$, a chromatic dispersion slope of $S_2$, and a ratio of $D_2/S_2$ in a range from around 0 to around 100, and wherein the dispersion compensating fiber exhibits an average chromatic dispersion of $D_3$, a chromatic dispersion slope of $S_3$, and a ratio of $D_3/S_3$ that is in a range defined from around 100 to around 200.

20. The composite optical fiber transmission line of claim 3, wherein the residual chromatic dispersion of the composite optical fiber transmission line is near 0.

21. The composite optical fiber transmission line of claim 3, wherein the residual slope of the composite optical fiber transmission line is near 0.

22. The composite optical fiber transmission line of claim 3, wherein the standard single-mode fiber exhibits an average chromatic dispersion of $D_1$, a chromatic dispersion slope of $S_1$, a ratio of $D_1/S_1$ in a range from around 250 to around 350, and is provided at a length $L_1$, wherein the nonzero dispersion shifted fiber exhibits an average chromatic dispersion of $D_2$, a chromatic dispersion slope of $S_2$, a ratio of $D_2/S_2$ in a range from around 0 to around 100, and is provided at a length $L_2$, and wherein the dispersion compensating fiber exhibits an average chromatic dispersion of $D_3$, a chromatic dispersion slope of $S_3$, a ratio of $D_3/S_3$ that is in a range defined from around 100 to around 200, and is provided at a length $L_3$.

23. The composite optical fiber transmission line of claim 3, wherein the values of length $L_1$, $L_2$, and $L_3$ are determined through the solution of the composite optical fiber transmission line equation, while the values of $D_1$, $D_2$, $D_3$, $S_1$, $S_2$, and $S_3$ are known.

24. The composite optical fiber transmission line of claim 3, wherein the standard single-mode fiber exhibits an average chromatic dispersion of $D_1$, a chromatic dispersion slope of $S_1$, a ratio of $D_1/S_1$ in a range from around 250 to around 350, and is provided at a length $L_1$, wherein the nonzero dispersion shifted fiber exhibits an average chromatic dispersion of $D_2$, a chromatic dispersion slope of $S_2$, a ratio of $D_2/S_2$ in a range from around 0 to around 100, and is provided at a length $L_2$, wherein the dispersion compensating fiber exhibits an average chromatic dispersion of $D_3$, a chromatic dispersion slope of $S_3$, and is provided at a length $L_3$.

25. The composite optical fiber transmission line of claim 3, wherein the values of length $D_3$, $S_3$, and $L_3$ are determined through the solution of the composite optical fiber transmission line equation, while the values of $D_1$, $D_2$, $S_1$, $S_2$, $L_1$ and $L_2$ are known.

26. The composite optical fiber transmission line of claim 2, wherein the dispersion shifted fiber is a standard dispersion shifted fiber.

27. The composite optical fiber transmission line of claim 26, wherein the standard dispersion shifted fiber exhibits an average chromatic dispersion of D, a chromatic dispersion slope of S, and a ratio of D/S of around 0.

28. The composite optical fiber transmission line of claim 26, wherein the standard dispersion shifted fiber exhibits an average chromatic dispersion of around 0 at 1550 nm.

29. The composite optical fiber transmission line of claim 2, wherein the standard single-mode fiber is an SMF-28 optical fiber.

30. An optical fiber transmission system comprising:
a transmitter operable to transmit an input optical signal;
a composite optical fiber transmission line that includes:
a single-mode fiber operable to receive an input optical signal at a first end and to generate a single-mode optical signal at a second end;
a dispersion shifted fiber in communication with the single-mode fiber and operable to receive the single-mode optical signal at a first end and to generate an output optical signal at a second end; and
a dispersion compensating fiber in communication with the dispersion shifted fiber and operable to receive the output optical signal and to generate a chromatic dispersion compensated optical signal;
a receiver operable to receive the chromatic dispersion compensated optical signal.

31. The optical fiber transmission system of claim 30, wherein the dispersion shifted fiber is a nonzero dispersion shifted fiber.

32. The optical fiber transmission system of claim 31, wherein the input optical signal is a WDM optical signal.

33. The optical fiber transmission system of claim 31, wherein the total length of the composite optical fiber transmission line includes around 45 percent of the standard single-mode fiber, around 45 percent of the nonzero dispersion shifted fiber, and around 10 percent of the dispersion compensating fiber.

34. The optical fiber transmission system of claim 31, wherein the dispersion compensating fiber is a relatively short length as compared to the length of the standard single-mode fiber and the length of the nonzero dispersion shifted fiber.

35. The optical fiber transmission system of claim 31, wherein the standard single-mode fiber exhibits an average chromatic dispersion of D, a chromatic dispersion slope of S, and a ratio of D/S in a range of 250 to 350.

36. The optical fiber transmission system of claim 31, wherein the residual chromatic dispersion of the composite optical fiber transmission line is at or near 0 and the residual slope of the composite optical fiber transmission line is at or near 0.

37. A method for making a composite optical fiber transmission line comprising:
providing a standard single-mode fiber with a first end, a second end, and a length $L_1$;
providing a nonzero dispersion shifted fiber with a first end, a second end, and a length $L_2$;
providing a dispersion compensating fiber with a first end and a length $L_3$;
interfacing the second end of the standard single-mode fiber to the first end of the nonzero dispersion shifted fiber;
interfacing the second end of the nonzero dispersion shifted fiber to the first end of the dispersion compensating fiber.

38. The method of claim 37, wherein the interfacing includes directly coupling the second end of the standard single-mode fiber to the first end of the nonzero dispersion shifted fiber, and directly coupling the second end of the nonzero dispersion shifted fiber to the first end of the dispersion compensating fiber.

39. The method of claim 37, wherein the standard single-mode fiber was previously installed and in operation before the nonzero dispersion shifted fiber was installed and in operation.

40. The method of claim 37, wherein $L_1$ is about 45 percent of the total length of the composite optical fiber transmission line, $L_2$ is about 45 percent of the total length of the composite optical fiber transmission line, and $L_3$ is about 10 percent of the total length of the composite optical fiber transmission line.

41. The method of claim 37, wherein the standard single-mode fiber exhibits an average chromatic dispersion of $D_1$, a chromatic dispersion slope of $S_1$, and a ratio of $D_1/S_1$ in a range from around 250 to around 350, wherein the nonzero dispersion shifted fiber exhibits an average chromatic dispersion of $D_2$, a chromatic dispersion slope of $S_2$, and a ratio of $D_2/S_2$ in a range from around 0 to around 100, and wherein the dispersion compensating fiber exhibits an average chromatic dispersion of $D_3$, a chromatic dispersion slope of $S_3$, and a ratio of $D_3/S_3$ that is in a range defined from around 100 to around 200.

42. The method of claim 37, further comprising:
   determining the values of length $L_1$, $L_2$ and $L_3$ through solving the composite optical fiber transmission line equation using the values of $D_1$, $D_2$, $D_3$, $S_1$, $S_2$, and $S_3$.

43. The method of claim 37, wherein the residual chromatic dispersion of the composite optical fiber transmission line is at or near 0 and the residual slope of the composite optical fiber transmission line is at or near 0.

* * * * *